(12) United States Patent
Burger et al.

(10) Patent No.: US 10,910,944 B2
(45) Date of Patent: Feb. 2, 2021

(54) VOLTAGE CONVERTER, ELECTRIC DRIVE SYSTEM AND METHOD FOR REDUCING INTERFERENCE VOLTAGES

(71) Applicant: Robert Bosch GmbH, Stuttgart (DE)

(72) Inventors: Dennis Burger, Friolzheim (DE); Eckart Hoene, Berlin (DE); Martin Lauersdorf, Knittlingen (DE); Norbert Schneider, Renningen-Malmsheim (DE); Roland Eidher, Nehren (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/752,390

(22) PCT Filed: Jun. 17, 2016

(86) PCT No.: PCT/EP2016/063981
§ 371 (c)(1),
(2) Date: Feb. 13, 2018

(87) PCT Pub. No.: WO2017/028990
PCT Pub. Date: Feb. 23, 2017

(65) Prior Publication Data
US 2019/0006941 A1    Jan. 3, 2019

(30) Foreign Application Priority Data
Aug. 20, 2015 (DE) .................. 10 2015 215 898

(51) Int. Cl.
| | | |
|---|---|---|
| *H02M 1/44* | (2007.01) |
| *H02M 7/5387* | (2007.01) |
| *H02P 27/06* | (2006.01) |
| *H02M 7/48* | (2007.01) |

(52) U.S. Cl.
CPC ........... *H02M 1/44* (2013.01); *H02M 7/5387* (2013.01); *H02P 27/06* (2013.01); *H02M 7/48* (2013.01)

(58) Field of Classification Search
CPC ....... H02M 1/44; H02M 1/12; H02K 11/0094
See application file for complete search history.

(56) References Cited

U.S. PATENT DOCUMENTS

| | | | |
|---|---|---|---|
| 5,552,976 A | | 9/1996 | Munro et al. |
| 5,999,423 A | * | 12/1999 | Steinke .................. H02M 7/48 363/40 |

(Continued)

FOREIGN PATENT DOCUMENTS

| | | |
|---|---|---|
| CN | 102271958 A | 12/2011 |
| CN | 102714469 A | 10/2012 |

(Continued)

OTHER PUBLICATIONS

International Search Report for Application PCT/EP2016/063981 dated Sep. 27, 2016 (English Translation, 3 pages).

(Continued)

*Primary Examiner* — Cortez M Cook
(74) *Attorney, Agent, or Firm* — Michael Best & Friedrich LLP

(57) ABSTRACT

The present invention relates to interference suppression of interference signals from an inverter. To this end, a current-compensated inductor is provided at the input end of an inverter, in particular a pulse-controlled inverter. This current-compensated inductor is preferably arranged between a DC voltage source and an intermediate circuit capacitor of the inverter. Polyphase inductors at the AC voltage output of the inverter can be dispensed with in this way.

17 Claims, 3 Drawing Sheets

(56) References Cited

U.S. PATENT DOCUMENTS

| | | | | |
|---|---|---|---|---|
| 2008/0104983 | A1* | 5/2008 | Yamai | H02M 5/458 62/228.1 |
| 2009/0224720 | A1* | 9/2009 | Oyobe | H02M 1/12 318/801 |
| 2011/0115416 | A1* | 5/2011 | Oh | H02J 7/345 318/139 |
| 2012/0014143 | A1* | 1/2012 | Schueneman | H02M 1/126 363/40 |
| 2012/0133320 | A1* | 5/2012 | Hsu | H02K 11/0094 318/716 |
| 2012/0275201 | A1 | 11/2012 | Koyama et al. | |

FOREIGN PATENT DOCUMENTS

| | | |
|---|---|---|
| CN | 102804159 A | 11/2012 |
| CN | 105765864 A | 7/2016 |
| DE | 4107391 | 9/1992 |
| DE | 102012109638 | 5/2014 |
| DE | 102013100246 | 7/2014 |
| DE | 102013100246 A1 * | 7/2014 ............ H02M 1/126 |
| DE | 102013100246 A1 | 7/2014 |

OTHER PUBLICATIONS

"Elektromagnetische Vertraglichkeit, Chapter 3: Koppelmechanismen und Gegenmassnahmen; Chapter 4: Passive Entstorkomponenten; Chapter 11: ??EMV gerechter Entwurf elektronischer Baugruppen ED—Schwab Adolf; Kurner Wolfgang",Jan. 1, 2011, pp. 11-112,157, XP002731659.

MuLiansheng et al., "Elektrische Steuerungs and Wartungstechnologie fur moderne Kohlebergbaumaschinen", China Coal Industry Press, 2008, (31 pages including statement of relevance).

* cited by examiner

VOLTAGE CONVERTER, ELECTRIC DRIVE SYSTEM AND METHOD FOR REDUCING INTERFERENCE VOLTAGES

BACKGROUND OF THE INVENTION

The present invention relates to a voltage converter and an electric drive system comprising a voltage converter, and a method for reducing interference voltages. In particular, the present invention relates to the reduction of interference voltages of a voltage converter.

The German patent application DE 41 07 391 A1 discloses an electric vehicle comprising a battery-fed inverter, in particular comprising a pulse-controlled inverter. In this case, a three-phase traction motor of an electric vehicle is fed via an inverter. The inverter draws its energy from a battery.

In the event of a capacitive loading such as occurs for example as a result of stray capacitances in a connected electric machine, pulse-controlled inverters may bring about common-mode interference. In this case, it is desirable to reduce the interference voltage spectrum emitted in the surroundings of an electric machine, in order to improve for example radio reception, in particular in the medium wave frequency range. Besides active filter techniques, it is known for example in this case to integrate a common-mode inductor into the connecting line between pulse-controlled inverter and electric machine. Since the connected electric machines are generally polyphase machines, such a common-mode inductor has to comprise all the connecting lines.

On account of the increasing importance of electric vehicles, there is therefore a need for a voltage converter which enables an effective and at the same time cost-effective filtering of interference voltages.

SUMMARY OF THE INVENTION

To that end, the present invention provides in accordance with a first aspect a voltage converter.

Accordingly, the present invention provides in a first aspect a voltage converter comprising an inverter and a current-compensated inductor. The inverter comprises a two-phase DC voltage input. The DC voltage input is connectable to a DC voltage source. Furthermore, the inverter comprises a polyphase AC voltage output. In particular, the AC voltage output can comprise at least three phase terminals. The AC voltage output is connectable to a load. In this case, the current-compensated inductor of the voltage converter can be arranged between the DC voltage input of the inverter and the DC voltage source.

In accordance with a further aspect, the present invention provides a method for reducing interference voltages.

Accordingly, the present invention provides a method for reducing interference voltages of a voltage converter comprising the steps of providing an inverter comprising a two-phase DC voltage input and a polyphase AC voltage output, and coupling a current-compensated inductor to the DC voltage input of the inverter.

The present invention is based on the concept of providing a current-compensated inductor at the input of an inverter in order to minimize common-mode interference of the inverter in this way. Preferably, the current-compensated inductor required for this purpose is provided on the DC voltage side of the inverter between a link capacitor and input-side Y-capacitors. In this case, the link capacitor is situated between the two input terminals of the inverter. The Y-capacitors are provided respectively between a reference potential and a terminal of the DC voltage input of the inverter.

As a result of the arrangement of a current-compensated inductor on the input side of the inverter, common-mode interference of the inverter can be minimized very well. Therefore, on the output side in the polyphase connection between inverter and load, no current-compensated inductor is need be provided in said polyphase connection, which inductor would be very costly on account of the higher number of phases between inverter and load. The voltage converter according to the invention thus enables a simple and cost-effective suppression of interference.

In accordance with one embodiment, the DC voltage input of the inverter comprises a first terminal and a second terminal. The current-compensated inductor of the voltage converter furthermore comprises a first winding and a second winding. In this case, the first winding of the current-compensated inductor is arranged between the first terminal of the DC voltage input of the inverter and a first terminal of the DC voltage source. The second winding of the current-compensated inductor is arranged between the second terminal of the DC voltage input of the inverter and a second terminal of the DC voltage source.

In accordance with a further embodiment, the AC voltage output of the inverter comprises a plurality of phase terminals. In this case, a capacitor is arranged between a reference potential and each phase terminal of the inverter. Such Y-capacitors make it possible to shift interference from the AC voltage side to the DC voltage side of the inverter.

In accordance with a further embodiment, the AC voltage output of the inverter comprises a plurality of phase terminals, wherein a series circuit comprising a capacitor and an electrical resistor is arranged between a reference potential and each phase terminal of the inverter. Capacitor and resistor thus form an RC element. In this way, it is possible to damp the interference voltage spectrum emitted by the inverter in a targeted manner for a predefined frequency range. By introducing the electrical/ohmic resistors, it is possible to minimize the common-mode current that is coupled out.

In accordance with a further embodiment, the capacitor or respectively the series circuit comprising capacitor and electrical resistor is arranged together with the inverter in a common power module. The integration of inverter and capacitor or respectively RC element in a common module enables a compact construction. Furthermore, a common cooling can be provided for dissipating heat from the inverter and dissipating the electrical power loss of the RC element.

In accordance with a further embodiment, the capacitor or respectively the series circuit comprising capacitor and electrical resistor is arranged on a terminal element of the electrical load. By way of example, the capacitors or respectively the RC elements can be arranged on the load side in the vicinity of the connecting terminals of the load.

In accordance with a further embodiment, the voltage converter furthermore comprises a link capacitor. Said link capacitor is arranged between the first terminal and the second terminal of the DC voltage input of the inverter. In particular, the link capacitor is arranged between the current-compensated inductor and the DC voltage input of the inverter. Furthermore, the voltage converter can also comprise so-called Y-capacitors. In this case, said Y-capacitors are connected to a common reference potential respectively on one side. In this case, the other terminal of the Y-capacitors is coupled respectively to a terminal of the inverter. In this case, the Y-capacitors are arranged upstream of the current-compensated inductor, that is to say the Y-capacitors are arranged between the DC voltage source and the current-compensated inductor. In this exemplary embodiment, the current-compensated inductor is thus arranged between the Y-capacitors and the link capacitor.

In accordance with a further exemplary embodiment of the method for reducing interference voltages, the method comprises a step for arranging respectively a capacitor or a series circuit comprising capacitor and electrical resistor (RC element) between a reference potential and each phase of the polyphase AC voltage output of the inverter.

In accordance with a further aspect, the present invention provides an electric drive system comprising a DC voltage source, an electric motor and a voltage converter according to the invention.

Further embodiments and advantages of the present invention will become apparent from the following description with reference to the accompanying drawings.

DETAILED DESCRIPTION

Figure 1:
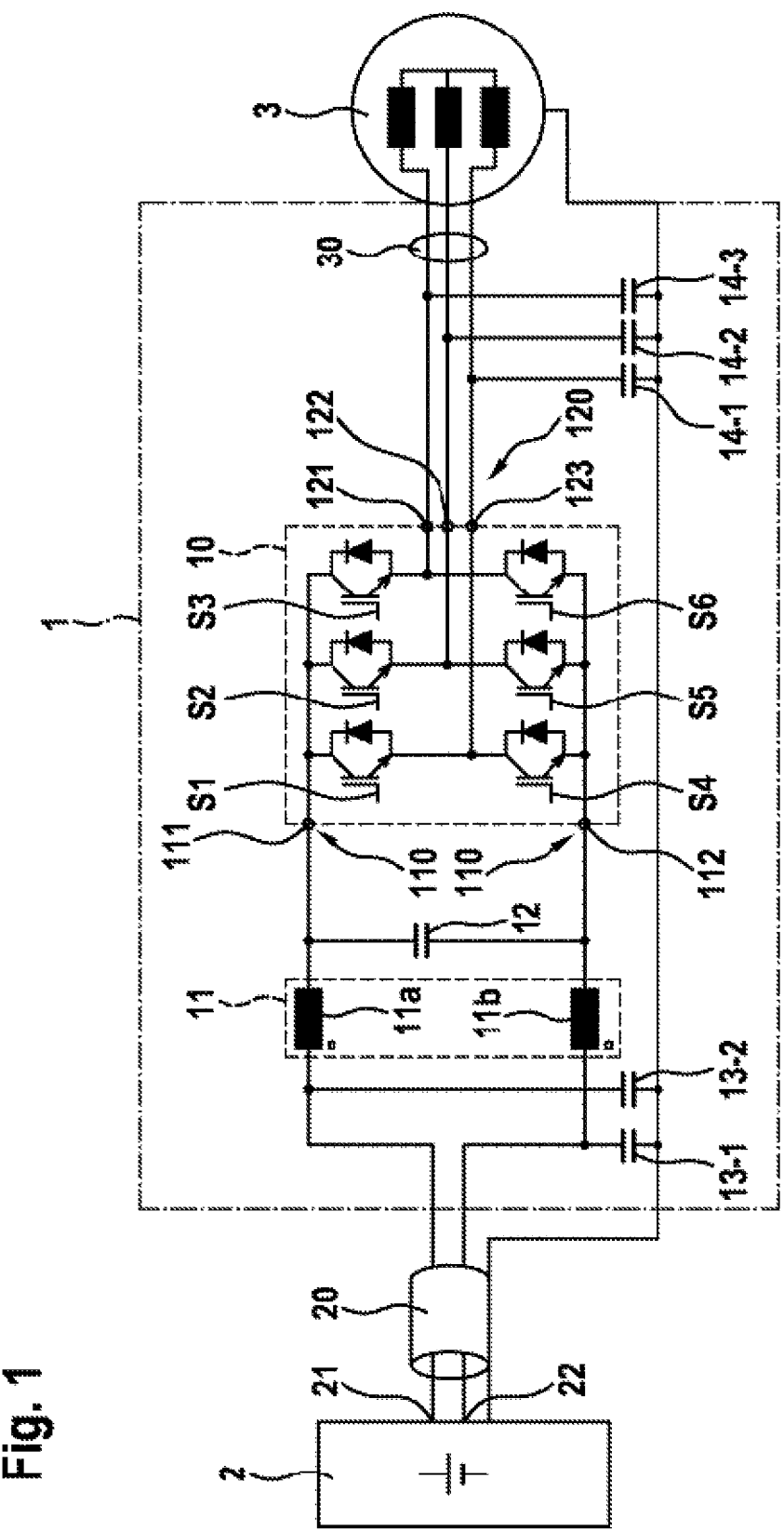
FIG. 1: shows a schematic illustration of an electric drive system comprising a voltage converter in accordance with one exemplary embodiment.

FIG. 1 shows a schematic illustration of an electric drive system in accordance with one embodiment. The electric drive system comprises a DC voltage source 2, an electrical load 3 and a voltage converter 1. Furthermore, the electric drive system may if appropriate, as necessary, comprise even further components as well. In order to afford a better understanding of the invention, however, possible further components of the electric drive system have not been illustrated here. The DC voltage source 2 can be a battery, for example. In particular, the traction battery of an electric vehicle is possible for example as the DC voltage source 2. Furthermore, however, arbitrary further DC voltage sources are possible as the DC voltage source 2. The electrical load 3 can be, as illustrated here, a three-phase electric motor, for example. In this case, arbitrary electric motors, for example, are possible as the electrical load 3. In particular, the electric motor 3 can be an asynchronous machine or a synchronous machine. The number of three electrical phases for the electrical load 3 as illustrated here should likewise be understood in this case to be merely by way of example. Furthermore, arbitrary electric motors or else arbitrary other electrical loads which have a number of phases that deviates from three are also possible. In particular, electrical loads having six phases are also possible.

Even though hereinafter the electric drive system is described to the effect that a voltage converter 1 is fed by a DC voltage source 2 and the inverter 1 is connected to an electrical load 3 at the output, nevertheless the drive system furthermore, if appropriate, in a further operating mode, can also convert electrical energy provided by the electric motor in generator operation into a DC voltage by means of the inverter 1. Said DC voltage can thereupon be fed into the DC voltage source 2 in order to charge a battery for example in this way.

In this case, the voltage converter 1 comprises an inverter 10. The inverter 10 can be a pulse-controlled inverter (PCI), for example. In particular, the inverter 10, as illustrated schematically in FIG. 1, can comprise for example a plurality of switching elements S1 to S6. Said switching elements can be for example semiconductor switching elements in the form of IGBTs or MOSFETs. The basic construction of the inverter, in particular of pulse-controlled inverters, is known, however, and so the construction need not be described in detail here.

On the DC voltage side, the inverter 10 comprises a two-phase DC voltage input 110. In this case, a first terminal 111 of the DC voltage input 110 is connected to one terminal 21 of the DC voltage source 2. The other terminal 112 of the DC voltage input 110 of the inverter 10 is connected to a further terminal 22 of the DC voltage source 2. The voltage converter 1 furthermore comprises a current-compensated inductor 11 between the DC voltage source 2 and the inverter 10. In this case, the current-compensated inductor 11 comprises two windings 11a and 11b. In this case, one winding of the current-compensated inductor 11 is arranged between the first terminal 21 of the DC voltage source 2 and the first terminal 111 of the inverter 10. The second winding 11b of the current-compensated inductor 11 is arranged between the second terminal 22 of the DC voltage source 2 and the second terminal 112 of the DC voltage input 110 of the inverter 10.

Furthermore, the voltage converter 1 can comprise a link capacitor 12 between the current-compensated inductor 11 and the DC voltage input 110 of the inverter 10. In this case, said link capacitor 12 is connected by one terminal to the current path between the first winding 11a of the current-compensated inductor 11 and the first terminal 111 of the DC voltage input 110 of the inverter 10. The other terminal of the link capacitor 12 is connected to the current path between the second winding 11b of the current-compensated inductor 11 and the second terminal 112 of the DC voltage input 110 of the inverter 10.

Furthermore, the voltage converter 1 can also comprise two so-called Y-capacitors 13-1 and 13-2 between the current-compensated inductor 11 and the DC voltage source 2. In this case, a first capacitor 13-1 is connected on one side to the current path between the first terminal 21 of the DC voltage source and the first winding 11a of the current-compensated inductor 11. The other terminal of said capacitor 13-1 is connected to a reference potential. Analogously, a second capacitor 13-2 is connected on one side to a current path between the second terminal 22 of the DC voltage source 2 and the second winding 11b of the current-compensated inductor 11. The other terminal of said second capacitor 13-2 is likewise connected to a reference potential.

In order to connect the voltage converter 1 to the DC voltage source 2, the voltage converter 1 can be connected to the DC voltage source 2 via a suitable cable connection 20.

On the output side of the inverter 10 of the voltage converter 1, the inverter 10 provides a polyphase AC voltage at an AC voltage output 120. As already described above, the three-phase AC voltage output illustrated here should be understood to be merely by way of example. A number of phases that deviates from three for the AC voltage is furthermore likewise possible.

In the exemplary embodiment illustrated here, the AC voltage output 120 comprises three terminals 121, 122 and 123. Each of said terminals 121 to 123 is connected to a corresponding terminal of the electrical load 3. Here, too, a suitable cable connection 30 can be provided between the voltage converter 1 and the electrical load 3. Furthermore, a respective output-side capacitor 14-1, 14-2 and 14-3 can be provided between the individual phase terminals, that is to say the connections between the terminals 121 to 123 of the inverter 10 and the electrical load 3 on one side and a reference potential on the other side. In this case, a first terminal of a first capacitor 14-1 can be electrically connected to a current path between the first terminal 121 of the AC voltage output 120 of the inverter and the first phase terminal of the electrical load 3. The other terminal of the first capacitor 14-1 can be electrically connected to a reference potential. Analogously, the second resistor 14-2 can be connected in the current path between the second terminal 122 of the AC voltage output 120 and the second phase terminal of the electrical load 3 on one side and the reference potential on the other side. A third capacitor 14-3 can likewise be connected to the current path between the third terminal 123 of the AC voltage output 120 and the third phase terminal of the electrical load 3 on one side and the reference potential on the other side.

The output-side capacitors 14-$i$ between the reference potential and the terminals 121, 122 and 123 at the AC voltage output 120 can be arranged in this case for example together with the inverter 110 in a common power module. In particular, it is possible in this case to arrange the inverter 10 and the capacitors 14-$i$ for example on a common carrier substrate. Alternatively, the capacitors 14-$i$ arranged between the terminals 121, 122 and 123 at the AC voltage terminal 120 of the inverter 10 and the reference potential can also be arranged jointly with the electrical load 3 together in one unit. By way of example, the capacitors 14-$i$ can be arranged at the connecting terminals of the electrical load 3.

Figure 2:
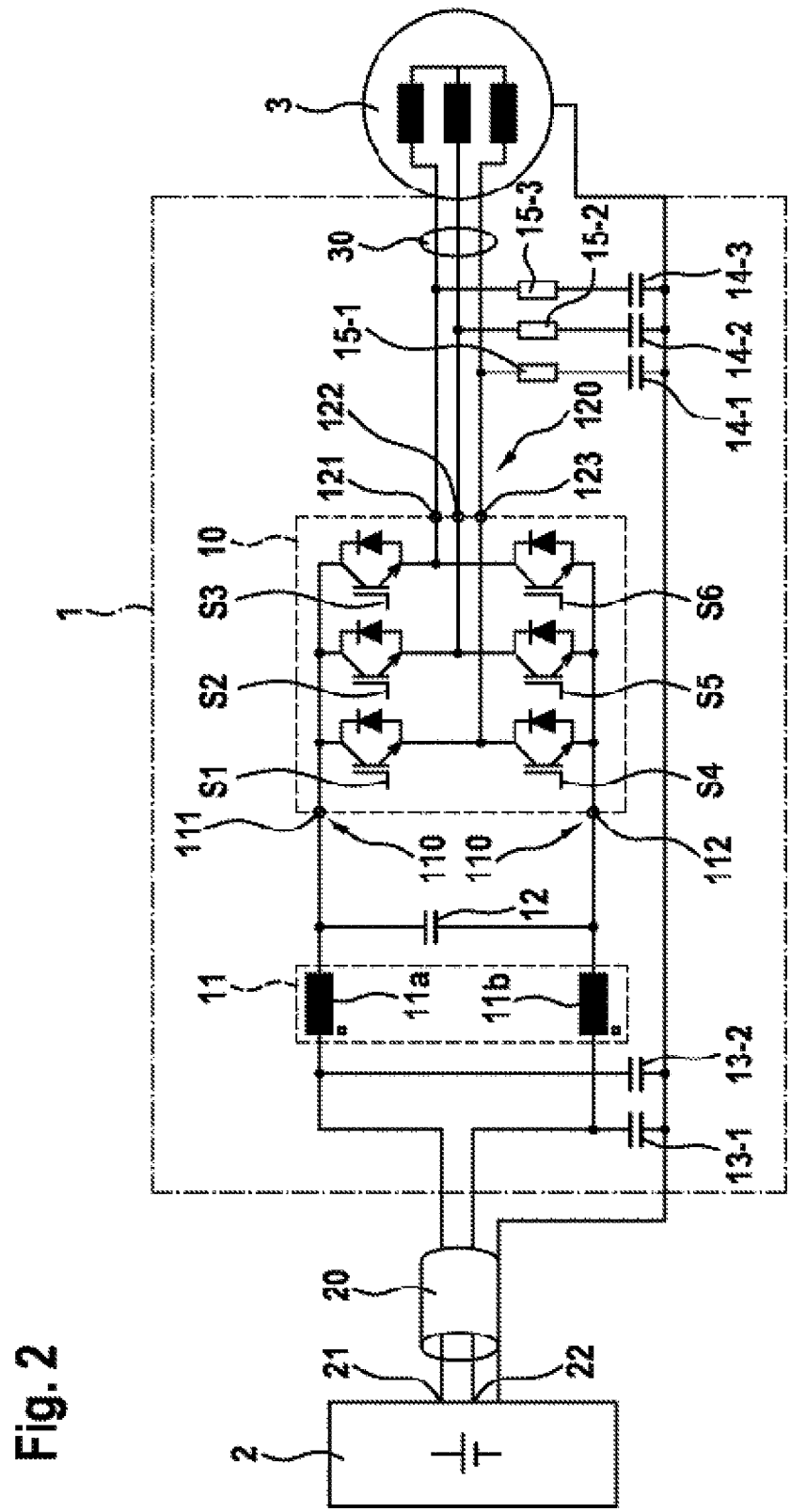
FIG. 2: shows a schematic illustration of an electric drive system comprising a voltage converter in accordance with a further exemplary embodiment.

FIG. 2 shows a further embodiment of an electric drive system comprising a voltage converter 1 in accordance with one embodiment. In this case, this embodiment is identical to the above-described embodiment to the greatest possible extent. In this case, the two embodiments differ only in the fact that in the embodiment in accordance with FIG. 2 now a series circuit comprising respectively a capacitor 14-$i$ and an electrical/ohmic resistor 15-$i$ is provided instead of the capacitors 14-$i$ between the terminals 121, 122 and 123 of the AC voltage output 120 and the reference potential. In this case, it is unimportant whether the electrical resistors 15-$i$ are arranged between the reference potential and the corresponding capacitors 14-$i$ or whether, alternatively, the resistors are arranged between the capacitors and the individual terminals 121, 122 and 123 of the AC voltage output 120 and all three capacitors 14-$i$ are thus connected on one side to the common reference potential.

Each series circuit comprising a resistor 15-$i$ and the corresponding capacitor 14-$i$ thus forms an RC element. In this case, the additional ohmic resistors 15-$i$ serve as damping resistors. Preferably, said resistors in this case are chosen to have the largest possible resistance. In the dimensioning of the resistors 15-$i$, the individual RC elements can be optimized to a predefined frequency range in this case. The cut-off frequency fg of the RC elements in this case results, using the resistance R and the capacitance C of the RC element, as:

$$fg=1/(2 \Pi \cdot R \cdot C).$$

In particular, by way of example, interference suppression for radio reception in the medium wave band may be chosen as the frequency range to be optimized. In this case, the cut-off frequency should be chosen to be greater than 2 MHz.

In this case, the resistors 15-$i$ additionally introduced in this way make it possible to minimize the common-mode current that is additionally coupled out, and to damp the interference voltage spectrum emitted by the inverter 10 in particular for a frequency range that is predefined in a targeted manner.

If, in this case, the resistors 15-$i$ or respectively the RC elements comprising the series circuit comprising the resistors 15-$i$ and the capacitors 14-$i$ are arranged together with the components of the inverter 10 in a common power module, then a particularly efficient construction is possible in this case. In particular, it is possible to provide the cooling provided for the cooling of the inverter 10 also at the same time for dissipating heat from the RC elements, in particular the electrical energy converted into heat at the ohmic resistors 15-$i$. Alternatively, analogously to the exemplary embodiment described in FIG. 1, here as well it is possible to arrange the RC elements comprising the resistors 15-$i$ and the capacitors 14-$i$ in the electrical load 3.

In principle arbitrary embodiments can be chosen in this case as electrical resistors 15-$i$ and respectively as capacitors 14-$i$. In particular, ceramic SMD capacitors and SMD chip resistors are possible, for example.

In this case, the voltage converter 1 according to the invention comprising a current-compensated inductor 11 at the DC voltage input of the inverter 10 can be used for arbitrary applications. In this regard, electric drive systems for electric or hybrid vehicles are possible, for example. Furthermore, inverter-fed industrial drives are likewise conceivable. Furthermore, the voltage converter according to the invention can for example also be used for industrial inverters, such as, for example, for solar installations or the like.

Figure 3:
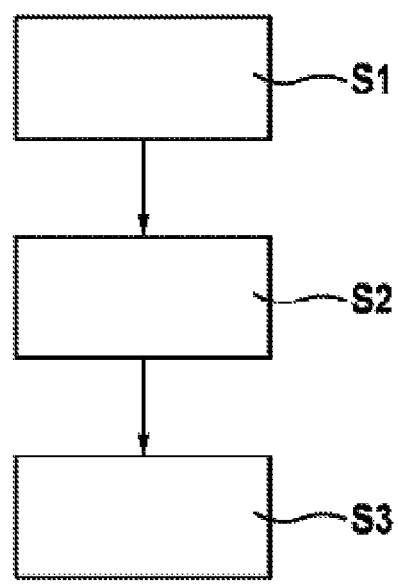
FIG. 3: shows a schematic illustration of a flow diagram such as underlies a method for reducing interference voltages in accordance with one exemplary embodiment.

FIG. 3 shows a schematic illustration of a flow diagram for a method for reducing interference voltages of a voltage converter such as underlies one embodiment. Step S1 involves providing an inverter comprising a two-phase DC voltage input and a polyphase AC voltage output. Step S2 involves coupling this inverter provided to a current-compensated inductor at the DC voltage input. Furthermore, in step S3, respectively a capacitor or alternatively a series circuit comprising a capacitor and an electrical resistor can be arranged between a reference potential and a respective phase of the polyphase AC voltage output of the inverter.

To summarize, the present invention provides cost-effective and efficient interference suppression of interference signals from an inverter. For this purpose, a current-compensated inductor is provided on the input side at an inverter, in particular a pulse-controlled inverter. Said current-compensated inductor is preferably arranged between a DC voltage source and a link capacitor of the inverter. Polyphase inductors at the AC voltage output of the inverter can be obviated in this way.

The invention claimed is:
1. A voltage converter (1), comprising:
an inverter (10), comprising a two phase DC voltage input (110) that includes a first terminal (111) and a second terminal (112), which are configured to be connected to a DC voltage source (2) having a first terminal (21) and a second terminal (22), and the inverter (10) including a polyphase AC voltage output (120), which is connectable to an electrical load (3);
a current-compensated inductor (11) including a first winding (11$a$) and a second winding (11$b$), wherein the first winding (11a) is arranged between the first terminal (111) of the DC voltage input (110) of the inverter (10) and the first terminal (21) of the DC voltage source (2), and the second winding (11b) is arranged between the second terminal (112) of the DC voltage input (110) of the inverter (10) and the second terminal (22) of the DC voltage source (2); and a link capacitor (12) having one end connected between the first terminal (111) and the first winding (11a) of the current-compensated inductor (11) and the link capacitor (12) having another end connected between the second terminal (112) of the DC voltage input (110) of the inverter (10) and the second winding (11b) of the current-compensated inductor (11).

2. The voltage converter (1) as claimed in claim 1, wherein the AC voltage output (120) of the inverter (10) comprises a plurality of phase terminals (121, 122, 123), and wherein a capacitor (14-i) is arranged between each phase terminal (121, 122, 123) of the inverter (10) and a reference potential.

3. The voltage converter (1) as claimed in claim 2, wherein the capacitor (14-i) or respectively a series circuit comprising the capacitor (14-i) and an electrical resistor (15-i) is arranged on a terminal element of the electrical load (3).

4. The voltage converter (1) as claimed in claim 1, wherein the AC voltage output (120) of the inverter (10) comprises a plurality of phase terminals (121, 122, 123), and wherein a series circuit comprising a capacitor (14-i) and an electrical resistor (15-i) is arranged between each phase terminal (121, 122, 123) of the inverter (10) and a reference potential.

5. The voltage converter (1) as claimed in claim 1, wherein the inverter (10) is a pulse-controlled inverter.

6. The voltage converter (1) as claimed in claim 1, wherein the first winding (11a) is in direct connection to the first terminal (21) of the DC voltage source (2) and the second winding (11b) is in direct connection to the second terminal (22) of the DC voltage source (2).

7. An electric drive system, comprising:
a DC voltage source (2) including a first terminal (21) and a second terminal (22);
an electric motor; and
a voltage converter (1) including
an inverter (10), including a two phase DC voltage input (110) having a first terminal (111) and a second terminal (112), which are connectable to the first terminal (21) and the second terminal (22) of the DC voltage source (2), and the inverter (10) including a polyphase AC voltage output (120), which is connectable to an electrical load (3);
a current-compensated inductor (11) including a first winding (11a) and a second winding (11b), wherein the first winding (11a) is arranged between the first terminal (111) of the DC voltage input (110) of the inverter (10) and the first terminal (21) of the DC voltage source (2), and wherein the second winding (11b) is arranged between the second terminal (112) of the DC voltage input (110) of the inverter (10) and the second terminal (22) of the DC voltage source (2); and
a link capacitor (12) having one end connected between the first terminal (111) and the first winding (11a) of the current-compensated inductor (11) and the link capacitor (12) having another end connected between the second terminal (112) of the DC voltage input (110) of the inverter (10) and the second winding (11b) of the current-compensated inductor (11).

8. The electric drive system as claimed in claim 7, wherein the inverter (10) is a pulse-controlled inverter.

9. The electric drive system as claimed in claim 8, wherein the AC voltage output (120) of the inverter (10) of the voltage converter (1) includes a plurality of phase terminals (121, 122, 123), and wherein a series circuit including a capacitor (14-i) and an electrical resistor (15-i) is arranged between each phase terminal (121, 122, 123) of the inverter (10) and a reference potential.

10. The electric drive system as claimed in claim 7, wherein the AC voltage output (120) of the inverter (10) includes a plurality of phase terminals (121, 122, 123), and wherein a series circuit comprising a capacitor (14-i) and an electrical resistor (15-i) is arranged between each phase terminal (121, 122, 123) of the inverter (10) and a reference potential.

11. The electric drive system as claimed in claim 7, wherein the AC voltage output (120) of the inverter (10) of the voltage converter (1) includes a plurality of phase terminals (121, 122, 123), and wherein a capacitor (14-i) is arranged between each phase terminal (121, 122, 123) of the inverter (10) and a reference potential.

12. The electric drive system as claimed in claim 11, wherein the capacitor (14-i) or respectively a series circuit including the capacitor (14-i) and an electrical resistor (15-i) is arranged on a terminal element of the electrical load (3).

13. The electric drive system as claimed in claim 7, wherein the first winding (11a) is in direct connection to the first terminal (21) of the DC voltage source (2) and the second winding (11b) is in direct connection to the second terminal (22) of the DC voltage source (2).

14. A method for reducing interference voltages of a voltage converter, comprising the following steps:
providing a DC voltage source (2) having a first terminal (21) and a second terminal (22); and
the voltage converter (1) including:
an inverter (10) including a two phase DC voltage input (110) having a first terminal (111) and a second terminal (112), and a polyphase AC voltage output (120);
a current-compensated inductor (11) coupled between the DC voltage source (2) and the DC voltage input (110) of the inverter (10) so that a first winding (11a) of the current-compensated inductor (11) is arranged between the first terminal (111) of the DC voltage input (110) of the inverter (10) and the first terminal (21) of the DC voltage source (2) and a second winding (11b) of the current-compensated inductor (11) is arranged between the second terminal (112) of the DC voltage input (110) of the inverter (10) and the second terminal (22) of the DC voltage source (2); and
a link capacitor (12) having one end connected between the first terminal (111) and the first winding (11a) of the current-compensated inductor (11) and the link capacitor (12) having another end connected between the second terminal (112) of the DC voltage input (110) of the inverter (10) and the second winding (11b) of the current-compensated inductor (11).

15. The method as claimed in claim 14, furthermore including a step for arranging respectively a capacitor (14-i) or a series circuit including a capacitor (14-i) and an electrical resistor (15-*i*) between a reference potential and each phase of the polyphase AC voltage output (120) of the inverter (10).

16. The method as claimed in claim 14, wherein the inverter (10) is a pulse-controlled inverter.

17. The method as claimed in claim 14, wherein the first winding (11*a*) is in direct connection to the first terminal (21) of the DC voltage source (2) and the second winding (11*b*) is in direct connection to the second terminal (22) of the DC voltage source (2).

* * * * *